US011074498B2

(12) United States Patent
Seo

(10) Patent No.: US 11,074,498 B2
(45) Date of Patent: Jul. 27, 2021

(54) STATIC AND DYNAMIC PRECISION ADAPTATION FOR HARDWARE LEARNING AND CLASSIFICATION

(71) Applicant: Jae-sun Seo, Tempe, AZ (US)

(72) Inventor: Jae-sun Seo, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 934 days.

(21) Appl. No.: 15/487,117

(22) Filed: Apr. 13, 2017

(65) Prior Publication Data

US 2017/0300815 A1 Oct. 19, 2017

Related U.S. Application Data

(60) Provisional application No. 62/321,822, filed on Apr. 13, 2016.

(51) Int. Cl.
*G06N 3/08* (2006.01)
*G06N 3/063* (2006.01)

(52) U.S. Cl.
CPC ............... *G06N 3/08* (2013.01); *G06N 3/063* (2013.01)

(58) Field of Classification Search
CPC ........... G06N 3/063; G06N 3/08; Y04S 10/54
See application file for complete search history.

(56) References Cited

U.S. PATENT DOCUMENTS

2016/0358075 A1* 12/2016 Zhang .................... G06N 3/088

OTHER PUBLICATIONS

Huda et al. ("Clock gating architectures for FPGA power reduction," 2009 International Conference on Field Programmable Logic and Applications, Prague, 2009, pp. 112-118) (Year: 2009).*

Kung et al. ("A Power-Aware Digital Feedforward Neural Network Platform with Backpropagation Driven Approximate Synapses", 2015 IEEE/ACM Symposium on Low Power Electronics and Design, 2015, pp. 85-90) (Year: 2015).*

Rastegari et al. ("XNOR-NET: ImageNet Classification Using Binary Convolutional Neural Networks", www.arxiv.org/pdf/1603.05279v1.pdf, arXiv: 1603.05279v1[cs.CV], Mar. 16, 2016, pp. 1-17) (Year: 2016).*

(Continued)

*Primary Examiner* — Kakali Chaki
*Assistant Examiner* — Robert Lewis Kulp
(74) *Attorney, Agent, or Firm* — Withrow & Terranova, P.L.L.C.

(57) ABSTRACT

An information processing system, which includes a control system and an artificial neural network, is disclosed. The artificial neural network includes a group of neurons and a group of synapses, which includes a first portion and a second portion. The control system selects one of a group of operating modes. The group of neurons processes information. The group of synapses provide connectivity to each of the group of neurons. During a first operating mode of the group of operating modes, the first portion of the group of synapses is enabled and the second portion of the group of synapses is enabled. During a second operating mode of the group of operating modes, the first portion of the group of synapses is enabled and the second portion of the group of synapses is disabled.

19 Claims, 7 Drawing Sheets

EXTERNALLY STORED DATA 18
CONTROL SYSTEM 12
16
ARTIFICIAL NEURAL NETWORK 14
10

(56) References Cited

OTHER PUBLICATIONS

Craven, Michael, P., "A faster learning neural network classifier using selective backpropagation," International Conference on Electronics, Circuits and Systems, Dec. 15-18, 1997, Cairo, Egypt, IEEE, pp. 254-258.
Gilberti, Michael, et al., "Adaptive Precision Neural Networks for Image Classification," NASA/ESA Conference on Adaptive Hardware and Systems, 2008, IEEE, pp. 244-251.
Haldar, Malay, et al., "FPGA Hardware Synthesis from MATLAB," International Conference on VLSI Design, 2001, IEEE, 6 pages.
Hauck, Scott, et al., "The Chimaera Reconfigurable Functional Unit," IEEE Transactions on Very Large Scale Integration (VLSI) Systems, vol. 12, Issue 2, Feb. 2004, pp. 206-217.
Himavathi, S., et al., "Feedforward Neural Network Implementation in FPGA Using Layer Multiplexing for Effective Resource Utilization," IEEE Transactions on Neural Networks, vol. 18, Issue 3, May 2007, IEEE, pp. 880-888.
Jacobs, Robert, A., "Adaptive precision pooling of model neuron activities predicts the efficiency of human visual learning," Journal of Vision, vol. 9, Issue 4, 2009, ARVO, 15 pages.
Kirkpatrick, Scott, et al., "Optimization by Simulated Annealing," Science, vol. 220, No. 4598, May 13, 1983, pp. 671-680.
Savich, Antony, W., et al., "The Impact of Arithmetic Representation on Implementing MLP-BP on FPGAs: A Study," IEEE Transactions on Neural Networks, vol. 18, Issue 1, Jan. 2007, IEEE, pp. 240-252.
Singh, Hartej, et al., "MorphoSys: An Integrated Reconfigurable System for Data-Parallel and Computation-Intensive Applications," IEEE Transactions on Computers, vol. 49, Issue 5, May 2000, IEEE, pp. 465-481.
Zhang, Hui, et al., "A 1-V Heterogeneous Reconfigurable DSP IC for Wireless Baseband Digital Signal Processing," IEEE Journal of Solid-State Circuits, vol. 35, Issue 11, Nov. 2000, IEEE, pp. 1697-1704.

* cited by examiner

STATIC AND DYNAMIC PRECISION ADAPTATION FOR HARDWARE LEARNING AND CLASSIFICATION

RELATED APPLICATIONS

This application claims the benefit of provisional patent application Ser. No. 62/321,822, filed Apr. 13, 2016, the disclosure of which is hereby incorporated herein by reference in its entirety.

FIELD OF THE DISCLOSURE

Embodiments of the present disclosure relate to information-processing systems, which may include artificial neural networks, control systems, or the like.

BACKGROUND

Artificial neural networks are processing systems that may utilize concepts inspired from study of biological neural systems. An artificial neural network may include multiple neurons and multiple synapses, which may provide interconnections to the neurons, to other synapses, to other interface elements, or any combination thereof. A neuron is defined as a processing element. As such, other terms, such as node, unit, element, processing element, processing circuit, or the like, may be synonymous with neuron. A synapse is defined as an interconnection element that provides connectivity within the artificial neural network. As such, other terms, such as connection link, connection, interconnection, link, communications link, or the like, may be synonymous with synapse.

Each synapse may have an associated weight. The weight of a synapse may be used to modify strength of a signal being conveyed via the synapse. Other terms, such as strength, gain, magnitude, or the like, may be synonymous with weight. As such, an artificial neural network may be characterized by the pattern of connections between, to, and from the neurons, and by the weights of the connections. Typically, an artificial neural network may undergo a learning process, in which the weights of the synapses are determined. Other terms, such as training process, or the like, may be synonymous with learning process. In this regard, the term training may be synonymous with the term learning. Once the weights of the synapses are determined, the artificial neural network may execute an inference process using the weights obtained during the learning process. Other terms, such as classification process, recognition process, or the like, may be synonymous with inference process. As such, the term inference may be synonymous with the terms classification, recognition, or the like. The artificial neural network may provide results obtained during the inference process. In this regard, artificial neural networks may be used for function approximation, regression analysis, classification, pattern recognition, novelty detection, decision making, data processing, analysis, automation, control, the like, or any combination thereof.

SUMMARY

An information processing system, which includes a control system and an artificial neural network, is disclosed according to one embodiment of the present disclosure. The artificial neural network includes a group of neurons and a group of synapses, which includes a first portion and a second portion. The control system selects one of a group of operating modes. The group of neurons processes information. The group of synapses provides connectivity to each of the group of neurons. During a first operating mode of the group of operating modes, the first portion of the group of synapses is enabled and the second portion of the group of synapses is enabled. During a second operating mode of the group of operating modes, the first portion of the group of synapses is enabled and the second portion of the group of synapses is disabled.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
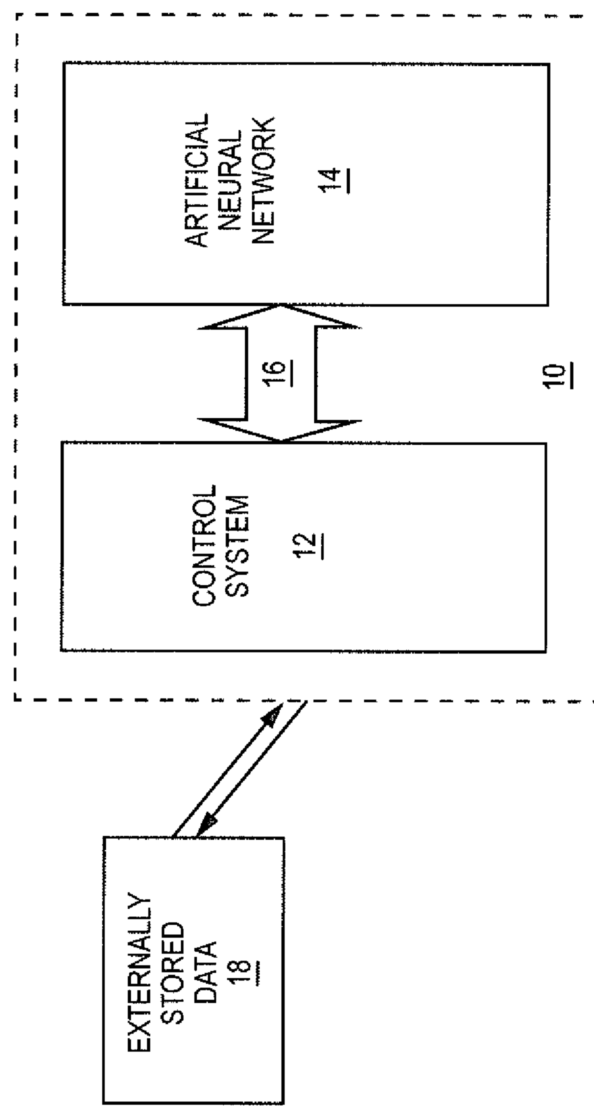
FIG. 1 shows an information processing system according to one embodiment of the information processing system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

An information processing system, which includes a control system and an artificial neural network, is disclosed according to one embodiment of the present disclosure. The artificial neural network includes a group of neurons and a group of synapses, which includes a first portion and a second portion. The control system selects one of a group of operating modes. The group of neurons processes information. The group of synapses provides connectivity to each of the group of neurons. During a first operating mode of the group of operating modes, the first portion of the group of synapses is enabled and the second portion of the group of synapses is enabled. During a second operating mode of the group of operating modes, the first portion of the group of synapses is enabled and the second portion of the group of synapses is disabled.

FIG. 1 shows an information processing system 10 according to one embodiment of the information processing system 10. The information processing system 10 includes a control system 12, an artificial neural network 14, and a communications interface 16, which is coupled between the control system 12 and the artificial neural network 14. The control system 12 provides information to the artificial neural network 14 via the communications interface 16 and receives information from the artificial neural network 14 via the communications interface 16. The information processing system 10 may provide externally stored data 18 to a data repository (not shown) that is external to the information processing system 10. Also, the information processing system 10 may receive externally stored data 18 from the data repository (not shown). The data repository (not shown) may be cloud storage based.

The control system 12 selects one of a group of operating modes. In one embodiment of the group of operating modes, the group of operating modes includes a first operating mode and a second operating mode. In one embodiment of the group of operating modes, the first operating mode is a learning operating mode and the second operating mode is an inference operating mode. In one embodiment of the learning operating mode, the learning operating mode may be referred to as a training operating mode. In one embodiment of the inference operating mode, the inference operating mode may be referred to as a classification operating mode. In one embodiment of the inference operating mode, the inference operating mode may be referred to as a recognition operating mode.

Figure 2:
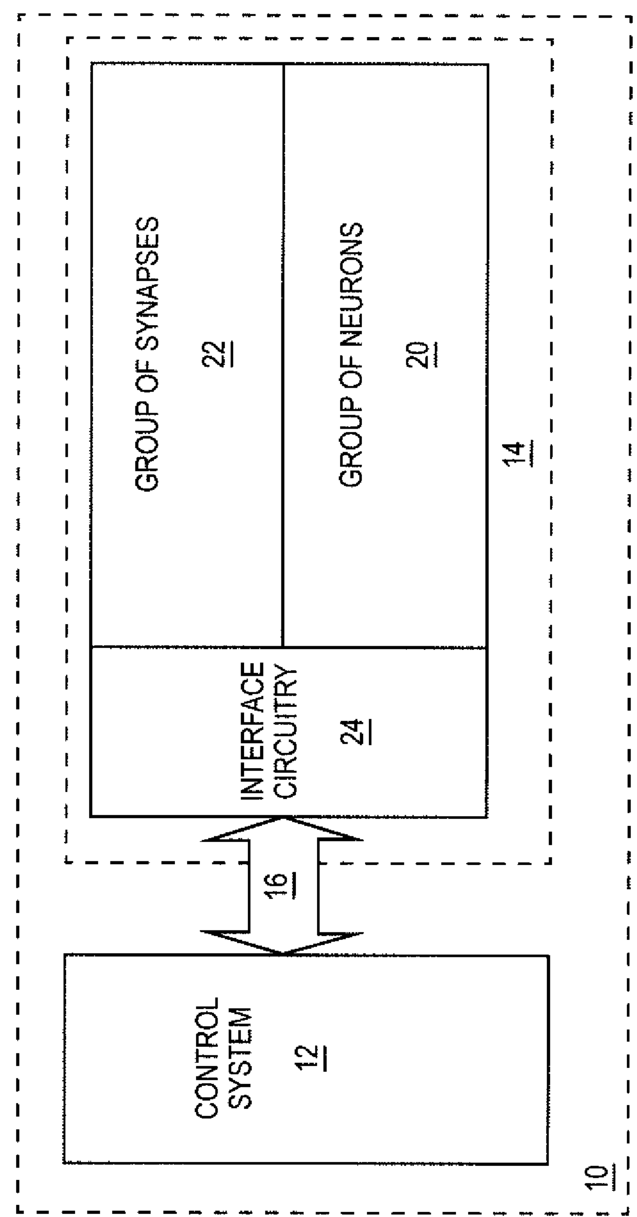
FIG. 2 shows details of the artificial neural network illustrated in FIG. 1 according to an alternate embodiment of the information processing system.

FIG. 2 shows details of the artificial neural network 14 illustrated in FIG. 1 according to an alternate embodiment of the information processing system 10. The artificial neural network 14 includes a group 20 of neurons, a group 22 of synapses, and interface circuitry 24. The group 20 of neurons and the group 22 of synapses are coupled to the interface circuitry 24. The interface circuitry 24 is coupled to the control system 12 via the communications interface 16. The group 22 of synapses provides interconnections to the group 20 of neurons. In one embodiment of the group 22 of synapses, the group 22 of synapses provides connectivity to each of the group 20 of neurons. In one embodiment of the group 20 of neurons, the group 20 of neurons processes information.

In one embodiment of the artificial neural network 14, during the first operating mode, the artificial neural network 14 has a first power consumption and during the second operating mode, the artificial neural network 14 has a second power consumption, which is less than the first power consumption. Each of the group 22 of synapses is associated with a corresponding one of a group of weights. During the first operating mode, the artificial neural network 14 trains the artificial neural network 14 to determine each of the group of weights.

In one embodiment of the artificial neural network 14, a highest precision of each of the group of weights is 16-bits. In one embodiment of the artificial neural network 14, the highest precision of each of the group of weights is 32-bits. In one embodiment of the artificial neural network 14, the highest precision of each of the group of weights is 64-bits.

In learning (e.g., during the first operating mode), single-bit synapses or a low number of bits synapses versus a high number of bit synapses shows evident trade-off of density versus learning capacity. Usually, towards the end of training, synapses converge toward a weak connection ('0') or a strong connection ('1'). During training, more levels accelerate learning and provide better fidelity. One approach of the present disclosure is to employ multi-bit synapses during training, and then only store single bits or a small number of bits for synapse weights after training converges.

In classification or inference (e.g., the second operating mode), the motivation stems from how humans monitor the outside world. Humans scan around with low accuracy, and only when an object of interest occurs, then they focus with high accuracy. The artificial neural network 14 of the present disclosure may be always on with minimal power consumption (i.e., low spiking/activation rate). Once an anomaly or abnormal behavior is observed, the whole attention is brought to the region with full activity.

Figure 3:
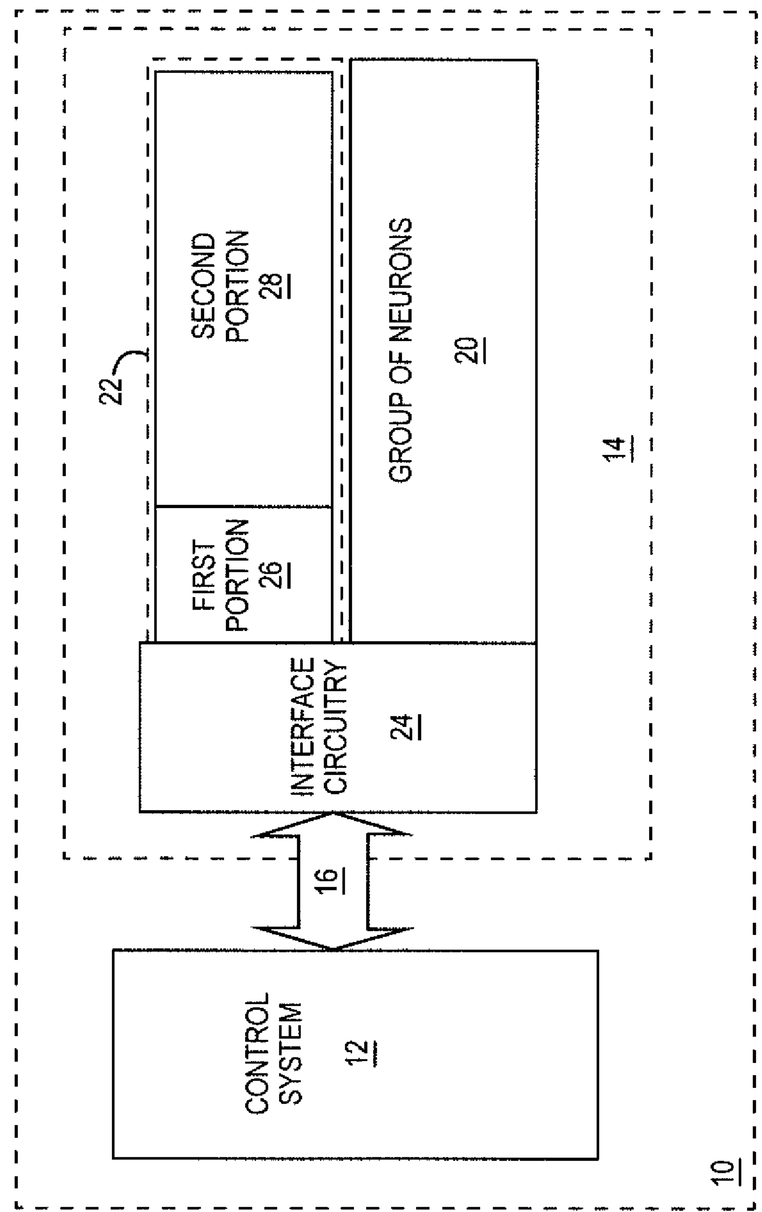
FIG. 3 shows further details of the artificial neural network illustrated in FIG. 2 according to an additional embodiment of the information processing system.

FIG. 3 shows further details of the artificial neural network 14 illustrated in FIG. 2 according to an additional embodiment of the information processing system 10. The group 22 of synapses illustrated in FIG. 3 includes a first portion 26 of the group 22 of synapses and a second portion 28 of the group 22 of synapses. In one embodiment of the artificial neural network 14, during the first operating mode, the first portion 26 of the group 22 of synapses is enabled and the second portion 28 of the group 22 of synapses is enabled. During the second operating mode, the first portion 26 of the group 22 of synapses is enabled and the second portion 28 of the group 22 of synapses is disabled. In one embodiment of the artificial neural network 14, the second portion 28 of the group 22 of synapses is enabled during the first operating mode, such that the artificial neural network 14 has a first power consumption. Further, the second portion 28 of the group 22 of synapses is disabled during the second operating mode, such that the artificial neural network 14 has a second power consumption, which is less than the first power consumption.

One approach of the present disclosure is to have inhibition or winner-take-all from upper to lower layers effectively control the spiking rate or sparsity. Once an event of interest occurs, the inhibition can be weakened to pay attention to many more spikes in a given time window, which then can trigger upper-layer networks in tandem.

A second approach of the present disclosure is to divide neurons and synapses into a low-precision (always-on) part and a high-precision part. The high-precision parts can be (1) stored off chip in a dynamic random-access memory (DRAM) and then reloaded when necessary or (2) stored on chip, but power-gated/clock-gated during normal operation to minimize power.

A third approach is to divide neurons and synapses into a low-precision (always-on) part and a high-precision part. The high-precision parts can be accessed only if necessary. For example, assume that the objective is to find out whether the sum of products exceeds a threshold. If the sum of products only computed with MSBs already exceeds the threshold, then there is no need to compute with LSBs, thus reducing memory access, computation, and power consumption.

Accordingly, in one embodiment of the artificial neural network 14, each of the first portion 26 of the group 22 of synapses is associated with a corresponding one of a first portion of the group of weights. The first portion of the group of weights is represented by a first group of binary numbers. Each of the second portion 28 of the group 22 of synapses is associated with a corresponding one of a second portion of the group of weights. The second portion of the group of weights is represented by a second group of binary numbers.

In one embodiment of the artificial neural network 14, the first portion of the group of weights is representative of at least a most significant bit (MSB) of the group of weights; and the second portion of the group of weights is representative of a group of least significant bits (LSBs) of the group of weights. In one embodiment of the artificial neural network 14, the artificial neural network 14 monitors the artificial neural network 14, such that if a triggering event is detected, the control system 12 selects a third operating mode of the group of operating modes. In one embodiment of the artificial neural network 14, during the third operating mode, the second portion 28 of the group 22 of synapses is enabled.

In one embodiment of the artificial neural network 14, during the second operating mode, the artificial neural network 14 monitors the artificial neural network 14, such that a triggering event is detected when the MSB of the group of weights is a logic 1. In one embodiment of the artificial neural network 14, during the second operating mode, the artificial neural network 14 monitors the artificial neural network 14, such that a triggering event is detected when the MSB of the group of weights is a logic 0.

In one embodiment of the artificial neural network 14, the first portion of the group of weights is representative of a group of MSBs of the group of weights. In one embodiment of the artificial neural network 14, during the second operating mode, the artificial neural network 14 monitors the artificial neural network 14, such that a triggering event is detected when the group of MSBs of the group of weights is above a threshold. In one embodiment of the artificial neural network 14, during the second operating mode, the artificial neural network 14 monitors the artificial neural network 14, such that a triggering event is detected when the group of MSBs of the group of weights is below a threshold. In one embodiment of the artificial neural network 14, during the second operating mode, the artificial neural network 14 monitors the artificial neural network 14, such that a triggering event is detected when the group of MSBs of the group of weights is above a first threshold and below a second threshold.

In one embodiment of the artificial neural network 14, a copy of the first group of binary numbers, a copy of the second group of binary numbers, or both are stored external to the information processing system 10. In one embodiment of the artificial neural network 14, the copy of the first group of binary numbers, the copy of the second group of binary numbers, or both are stored as at least part of the externally stored data 18 (FIG. 1).

In one embodiment of the artificial neural network 14, the first portion 26 of the group 22 of synapses includes first clock-gated memory to store the first portion of the group of weights. The second portion 28 of the group 22 of synapses includes second clock-gated memory to store the second portion of the group of weights. During the first operating mode, a first clock signal to the first portion 26 of the group 22 of synapses is enabled, thereby allowing access to the first portion of the group of weights; and a second clock signal to the second portion 28 of the group 22 of synapses is enabled, thereby allowing access to the second portion of the group of weights. During the second operating mode, the first clock signal to the first portion 26 of the group 22 of synapses is enabled, thereby allowing access to the first portion of the group of weights; and the second clock signal to the second portion 28 of the group 22 of synapses is disabled, thereby preventing access to the second portion of the group of weights and reducing power consumption.

In one embodiment of the artificial neural network 14, the first portion 26 of the group 22 of synapses includes a first power-gated memory to store the first portion of the group of weights. The second portion 28 of the group 22 of synapses includes a second power-gated memory to store the second portion of the group of weights. During the first operating mode, the first power-gated memory is enabled, thereby allowing access to the first portion of the group of weights; and the second power-gated memory is enabled, thereby allowing access to the second portion of the group of weights. During the second operating mode, the first power-gated memory is enabled, thereby allowing access to the first portion of the group of weights; and the second power-gated memory is disabled, thereby preventing access to the second portion of the group of weights and reducing power consumption.

Figure 4:
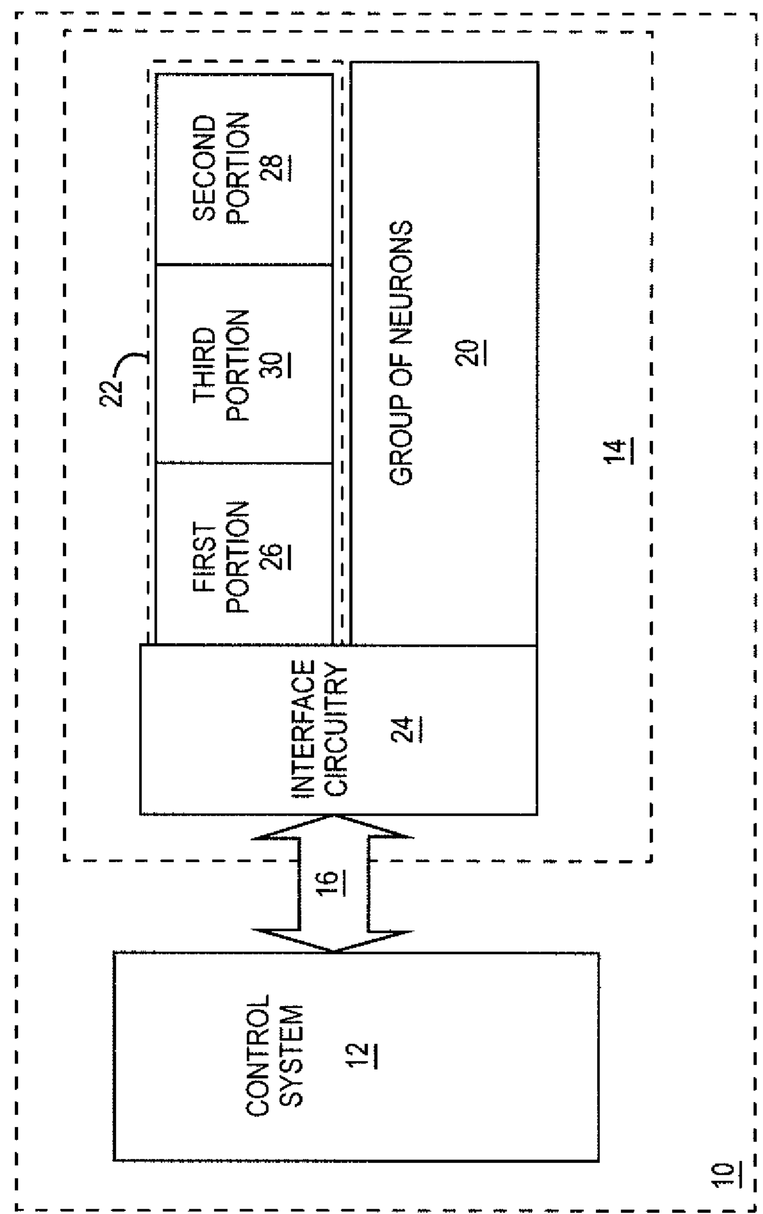
FIG. 4 shows further details of the artificial neural network illustrated in FIG. 2 according to another embodiment of the information processing system.

FIG. 4 shows further details of the artificial neural network 14 illustrated in FIG. 2 according to another embodiment of the information processing system 10. The artificial neural network 14 illustrated in FIG. 4 is similar to the artificial neural network 14 illustrated in FIG. 3, except the group 22 of synapses further includes a third portion 30 of the group 22 of synapses. Each of the third portion 30 of the group 22 of synapses is associated with a corresponding one of a third portion of the group of weights. In one embodiment of the artificial neural network 14, the third portion of the group of weights is representative of a group of middle significant bits of the group of weights.

In one embodiment of the artificial neural network 14, during the second operating mode, the artificial neural network 14 monitors the artificial neural network 14, such that if a triggering event is detected, the control system 12 selects a third operating mode of the group of operating modes, such that during the third operating mode, the third portion 30 of the group 22 of synapses is enabled.

Figure 5:
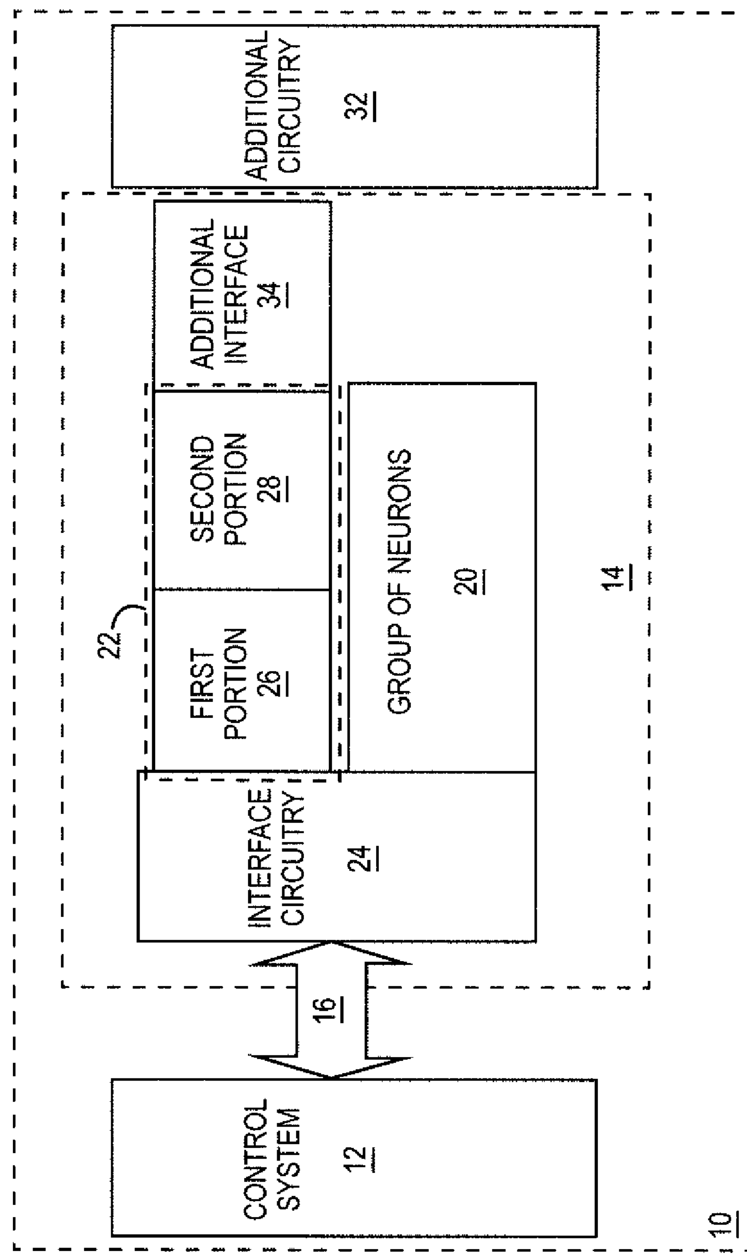
FIG. 5 shows the information processing system according to a further embodiment of the information processing system.

FIG. 5 shows the information processing system 10 according to a further embodiment of the information processing system 10. The information processing system 10 illustrated in FIG. 5 is similar to the information processing system 10 illustrated in FIG. 3, except the information processing system 10 illustrated in FIG. 5 further includes additional circuitry 32 and the artificial neural network 14 further includes an additional interface 34 coupled between the second portion 28 of the group 22 of synapses and the additional circuitry 32.

In one embodiment of the information processing system 10, during the second operating mode, the interface circuitry 24 does not access the second portion 28 of the group 22 of synapses and the additional circuitry 32 may access the second portion 28 of the group 22 of synapses via the additional interface 34.

Figure 6:
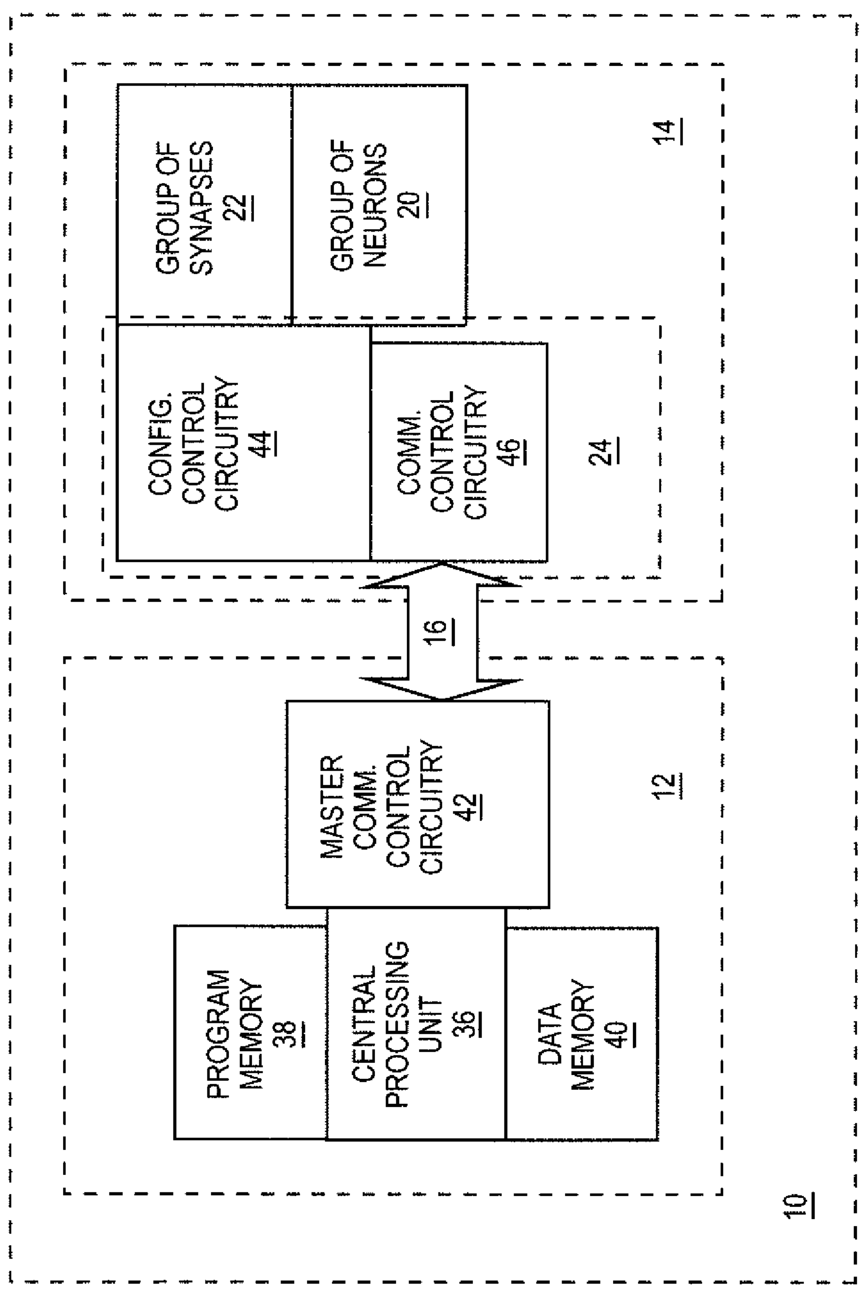
FIG. 6 shows details of the artificial neural network illustrated in FIG. 1 according to one embodiment of the information processing system.

FIG. 6 shows details of the information processing system 10 illustrated in FIG. 2 according to one embodiment of the information processing system 10. In this regard, FIG. 6 shows details of the control system 12 and the interface circuitry 24 illustrated in FIG. 2.

The control system 12 includes a central processing unit 36, program memory 38, data memory 40, and master communications control circuitry 42. The interface circuitry 24 includes configuration control circuitry 44 and communications control circuitry 46. The communications interface 16 is coupled between the master communications control circuitry 42 and the communications control circuitry 46. The central processing unit 36 executes control software or firmware that is stored in the program memory 38. The central processing unit 36 may use the data memory 40, as needed, to configure, control, and operate the information processing system 10. The central processing unit 36 uses the master communications control circuitry 42 to communicate with the artificial neural network 14 via the communications interface 16. As such, the central processing unit 36 may configure, control, and monitor the artificial neural network 14 via the communications interface 16 using the communications control circuitry 46.

In one embodiment of the artificial neural network 14, the configuration control circuitry 44 may configure, control, and monitor the artificial neural network 14. The central processing unit 36 may communicate with the configuration control circuitry 44 via the communications control circuitry 46. The configuration control circuitry 44 is coupled to the group 22 of synapses. In one embodiment of the artificial neural network 14, the configuration control circuitry 44 is coupled to the group 20 of neurons via the group 22 of synapses. In one embodiment of the artificial neural network 14, the configuration control circuitry 44 is directly coupled to the group 20 of neurons.

Figure 7:
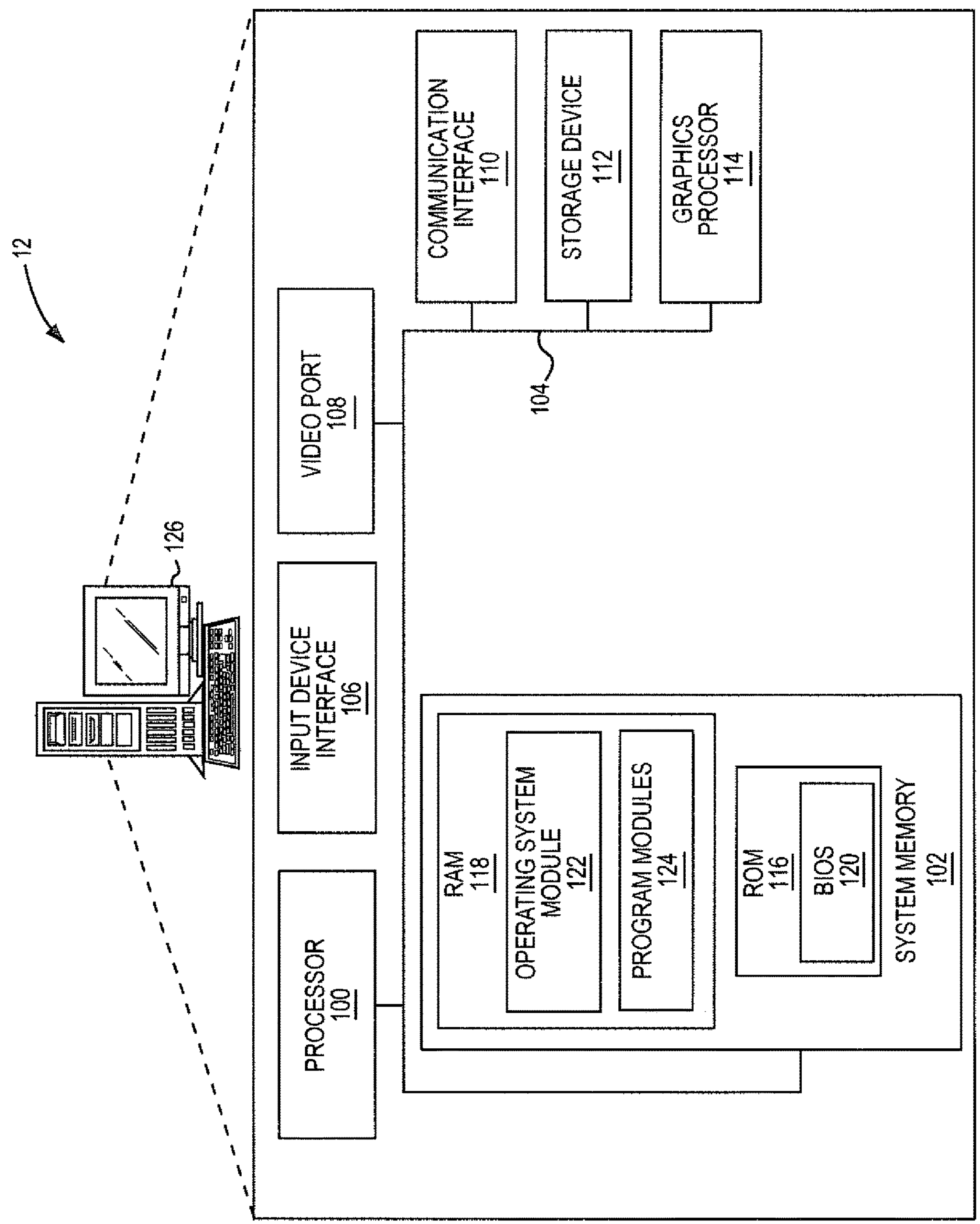
FIG. 7 shows details of the control system illustrated in FIG. 1 according to one embodiment of the control system.

FIG. 7 shows details of the control system 12 illustrated in FIG. 1 according to one embodiment of the control system 12. FIG. 7 is a block diagram of the control system 12 according to one embodiment of the present disclosure. The control system 12 includes a processor 100, a system memory 102, a system bus 104, an input device interface 106, a video port 108, a communication interface 110, a computer readable storage device 112, and a graphics processor 114. The system bus 104 provides an interface for system components including, but not limited to, the system memory 102 and the processor 100. The processor 100 may be any commercially available or proprietary processor. Dual microprocessors and other multi-processor architectures may also be employed as the processor 100.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory (e.g., read only memory (ROM) 116, erasable programmable read only memory (EPROM), electrically erasable programmable read only memory (EEPROM), etc.) and/or volatile memory (e.g., random access memory (RAM) 118).

A basic input/output system (BIOS) 120 may be stored in the non-volatile memory, and can include the basic routines that help to transfer information between elements within the control system 12. The volatile memory may also include a high-speed RAM 118, such as static RAM, for caching data.

The control system 12 may further include the computer-readable storage device 112, which may comprise, by way of non-limiting example, an internal hard disk drive (HDD) (for example, an enhanced integrated drive electronics (EIDE) HDD or serial advanced technology attachment (SATA) HDD), a flash memory, or the like.

The computer-readable storage device 112 and other drives, sometimes referred to as computer-readable or computer-usable media provide non-volatile storage of data, data structures, computer-executable instructions, and the like. Although for purposes of illustration the description of the computer-readable storage device 112 above refers to a HDD, it should be appreciated by those skilled in the art that other types of media which are readable by a computer, such as zip disks, magnetic cassettes, flash memory cards, cartridges, a Universal Serial Bus memory stick, and the like, may also be used in the operating environment, and further, that any such media may contain computer-executable instructions for performing novel functionality as disclosed herein.

A number of modules can be stored in the computer-readable storage device 112 and in the volatile memory, including an operating system module 122 and one or more program modules 124, which may implement the functionality described herein in whole or in part. It is to be appreciated that the embodiments can be implemented with various commercially available operating system modules or combinations of operating system modules 122.

All or a portion of the embodiments may be implemented as a computer program product stored on a non-transitory computer-usable or computer-readable storage medium, such as the computer-readable storage device 112, which may include complex programming instructions, such as complex computer-readable program code, configured to cause the processor 100 to carry out the functionality described herein. Thus, the computer-readable program code can comprise software instructions for implementing the functionality of the embodiments described herein when executed on the processor 100. The processor 100, in conjunction with the program modules 124 in the volatile memory, may serve as the control system 12 that is configured to or adapted to implement the functionality described herein.

A user may be able to enter commands and information into the control system 12 through one or more input devices, such as, for example, a keyboard (not illustrated), a pointing device such as a mouse (not illustrated), a touch-sensitive surface (not illustrated), or the like. Other input devices may include a microphone, an infrared (IR) remote control, a joystick, a game pad, a stylus pen, or the like. These and other input devices may be connected to the processor 114 through the input device interface 106 that is coupled to the system bus 104, but can be connected by other interfaces such as a parallel port, an Institute of Electrical and Electronic Engineers (IEEE) 1394 serial port, a Universal Serial Bus (USB) port, an IR interface, and the like.

The control system 12 may also include the communication interface 110 suitable for communicating with a network. The control system 12 may also include the video port 108 that drives a display device 126. The video port 108 may receive imagery, such as water surface imagery, from the graphics processor 114. The display device 126 may be separate from the control system 12, or may be integrated with the device. Non-limiting examples of the display device 126 include an LCD or plasma monitor, a projector, or a head-mounted display.

In alternate embodiments of the control system 12, the control system 12 may comprise any computing or processing device capable of executing software instructions to implement the functionality described herein, such as, by way of non-limiting example, a work station, a desktop or laptop computer, a tablet computer, or the like.

Those skilled in the art will recognize improvements and modifications to the preferred embodiments of the present disclosure. All such improvements and modifications are considered within the scope of the concepts disclosed herein and the claims that follow.

What is claimed is:

1. An information processing system comprising:

a control system configured to select one of a plurality of operating modes comprising a learning mode, a first inference mode, and a second inference mode; and an artificial neural network comprising:

a plurality of neurons configured to process information; and a plurality of synapses comprising a first portion and a second portion, and configured to provide connectivity to each of the plurality of neurons, wherein:

each of the plurality of synapses is associated with a corresponding one of a plurality of weights;

during the learning mode, the first portion of the plurality of synapses is configured to be enabled and the second portion of the plurality of synapses is configured to be enabled;

during the first inference mode, the first portion of the plurality of synapses is configured to be enabled and the second portion of the plurality of synapses is configured to be disabled such that the artificial neural network is configured to classify incoming data at a lower bit precision;

during the first inference mode, the artificial neural network is configured to monitor the artificial neural network, such that the control system selects the second inference mode when a triggering event is detected based on a classification result during the first inference mode; and during the second inference mode, the second portion of the plurality of synapses is configured to be enabled such that the artificial neural network is configured to classify the incoming data at a higher bit precision than the first inference mode.

2. The information processing system of claim 1 wherein during the learning mode, the artificial neural network has a first power consumption, and during the first inference mode, the artificial neural network has a second power consumption, which is less than the first power consumption.

3. The information processing system of claim 1 wherein during the learning mode, the artificial neural network is configured to train the artificial neural network to determine each of the plurality of weights.

4. The information processing system of claim 1 wherein a highest bit precision of each of the plurality of weights is 32 bits.

5. The information processing system of claim 1 wherein:

each of the first portion of the plurality of synapses is associated with a corresponding one of a first portion of the plurality of weights;

each of the second portion of the plurality of synapses is associated with a corresponding one of a second portion of the plurality of weights;

the second portion of the plurality of weights is configured to be represented by a plurality of binary numbers; and a copy of the plurality of binary numbers is configured to be stored external to the information processing system.

6. The information processing system of claim 1 wherein:

each of the first portion of the plurality of synapses is associated with a corresponding one of a first portion of the plurality of weights;

each of the second portion of the plurality of synapses is associated with a corresponding one of a second portion of the plurality of weights;

the second portion of the plurality of synapses comprises clock-gated memory configured to store the second portion of the plurality of weights;

during the learning mode, a clock signal to the clock-gated memory is configured to be enabled, thereby allowing access to the second portion of the plurality of weights; and during the first inference mode, the clock signal to the clock-gated memory is configured to be disabled, thereby preventing access to the second portion of the plurality of weights and reducing power consumption.

7. The information processing system of claim 1 wherein:

each of the first portion of the plurality of synapses is associated with a corresponding one of a first portion of the plurality of weights;

each of the second portion of the plurality of synapses is associated with a corresponding one of a second portion of the plurality of weights;

the second portion of the plurality of synapses comprises power-gated memory configured to store the second portion of the plurality of weights;

during the learning mode, the power-gated memory is configured to be enabled, thereby allowing access to the second portion of the plurality of weights; and during the first inference mode, the power-gated memory is configured to be disabled, thereby preventing access to the second portion of the plurality of weights and reducing power consumption.

8. The information processing system of claim 1 wherein:

each of the first portion of the plurality of synapses is associated with a corresponding one of a first portion of the plurality of weights;

each of the second portion of the plurality of synapses is associated with a corresponding one of a second portion of the plurality of weights;

the first portion of the plurality of weights is representative of at least a most significant bit (MSB) of the plurality of weights; and the second portion of the plurality of weights is representative of a plurality of least significant bits (LSBs) of the plurality of weights.

9. The information processing system of claim 8 wherein:

the plurality of synapses further comprises a third portion;

each of the third portion of the plurality of synapses is associated with a corresponding one of a third portion of the plurality of weights;

the third portion of the plurality of weights is representative of a plurality of middle significant bits of the plurality of weights; and during the first inference mode, the artificial neural network is configured to monitor the artificial neural network, such that if another triggering event is detected, the control system is further configured to select a fourth operating mode of the plurality of operating modes, such that during the fourth operating mode of the plurality of operating modes, the third portion of the plurality of synapses is configured to be enabled.

10. The information processing system of claim 8 wherein the triggering event is detected when the MSB of the plurality of weights is a logic 1.

11. The information processing system of claim 8 wherein the triggering event is detected when the MSB of the plurality of weights is a logic 0.

12. The information processing system of claim 8 wherein:

the first portion of the plurality of weights is representative of a plurality of MSBs of the plurality of weights; and the triggering event is detected when the plurality of MSBs of the plurality of weights is above a threshold.

13. The information processing system of claim 8 wherein:

the first portion of the plurality of weights is representative of a plurality of MSBs of the plurality of weights; and the triggering event is detected when the plurality of MSBs of the plurality of weights is below a threshold.

14. The information processing system of claim 8 wherein:

the first portion of the plurality of weights is representative of a plurality of MSBs of the plurality of weights; and the triggering event is detected when the plurality of MSBs of the plurality of weights is above a first threshold and below a second threshold.

15. The information processing system of claim 1 further comprising additional circuitry, wherein the artificial neural network further comprises an additional interface, which is coupled between the second portion of the plurality of synapses and the additional circuitry.

16. The information processing system of claim 15 wherein during the first inference mode, the additional circuitry is configured to access the second portion of the plurality of synapses via the additional interface.

17. The information processing system of claim 6 wherein during the second inference mode, the clock signal is configured to be enabled, thereby increasing power consumption only when the triggering event is detected.

18. The information processing system of claim 7 wherein during the second inference mode, a clock signal is configured to be enabled, thereby increasing power consumption only when the triggering event is detected.

19. The information processing system of claim 7 wherein during the second inference mode, the power-gated memory is configured to be enabled, thereby allowing access to the second portion of the plurality of weights.

* * * * *